United States Patent [19]
Anderson

[11] Patent Number: 6,148,142
[45] Date of Patent: *Nov. 14, 2000

[54] MULTI-USER, ON-DEMAND VIDEO SERVER SYSTEM INCLUDING INDEPENDENT, CONCURRENTLY OPERATING REMOTE DATA RETRIEVAL CONTROLLERS

[75] Inventor: Michael H. Anderson, Moorpark, Calif.

[73] Assignee: Intel Network Systems, Inc., Bedford, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/966,770

[22] Filed: Nov. 7, 1997

Related U.S. Application Data

[63] Continuation of application No. 08/676,893, Jul. 8, 1996, abandoned, which is a continuation of application No. 08/214,859, Mar. 18, 1994, abandoned.

[51] Int. Cl.[7] ............................... H04N 5/76; H04N 7/10
[52] U.S. Cl. ............................... 386/125; 386/126; 348/7; 348/12
[58] Field of Search ........................ 348/7–8, 10, 12–13; 386/1, 4, 45–46, 52, 125–126, 69–70; 455/3.1, 3.2, 4.1, 4.2, 5.1, 6.1, 6.3; H04N 5/76, 5/92

[56] References Cited

U.S. PATENT DOCUMENTS

| | | |
|---|---|---|
| 4,506,387 | 3/1985 | Walter . |
| 4,733,313 | 3/1988 | Izumita et al. . |
| 4,870,643 | 9/1989 | Bultman et al. . |
| 4,890,320 | 12/1989 | Monslow et al. . |
| 4,920,432 | 4/1990 | Eggers et al. . |
| 5,072,378 | 12/1991 | Manka . |
| 5,130,792 | 7/1992 | Tindell et al. . |
| 5,191,436 | 3/1993 | Yonemitsu ............................... 358/335 |
| 5,191,584 | 3/1993 | Anderson . |
| 5,218,672 | 6/1993 | Morgan et al. ........................... 358/342 |
| 5,231,512 | 7/1993 | Ebihara et al. ........................... 358/335 |
| 5,274,463 | 12/1993 | Matsumoto et al. ..................... 358/335 |
| 5,414,455 | 5/1995 | Hooper et al. .............................. 348/7 |
| 5,440,336 | 8/1995 | Buhro et al. ................................ 348/7 |
| 5,768,625 | 6/1998 | Muramatsu et al. ..................... 395/876 |
| 5,771,349 | 6/1998 | Picazo, Jr. et al. .......................... 380/4 |
| 5,781,687 | 7/1998 | Parks ......................................... 386/52 |

Primary Examiner—Thai Tran
Attorney, Agent, or Firm—Leah Sherry; Oppenheimer Wolff & Donnelly LLP

[57] ABSTRACT

A plurality of movies are distributively stored in digital form on a mass storage unit such as a Redundant Array of Inexpensive Drives (RAID) disk drive system such that they can be viewed on demand by multiple users. A master controller receives movie requests from users, and generates designation commands through a Small Computer System Interface (SCSI) bus that designates a retrieval controller at the requesting user's facility, and locations of the requested movie data in the RAID system. Successive designation commands are generated for successive blocks of the movie data. A designated retrieval controller reads a designated block of data from the RAID system through the SCSI bus, and converts the retrieved data into video picture and audio format to show the movie on a television receiver at the requesting user's facility. The movie data is preferably compressed on the RAID system in Motion Picture Experts Group (MPEG) format, and decompressed by the retrieval controllers.

40 Claims, 5 Drawing Sheets

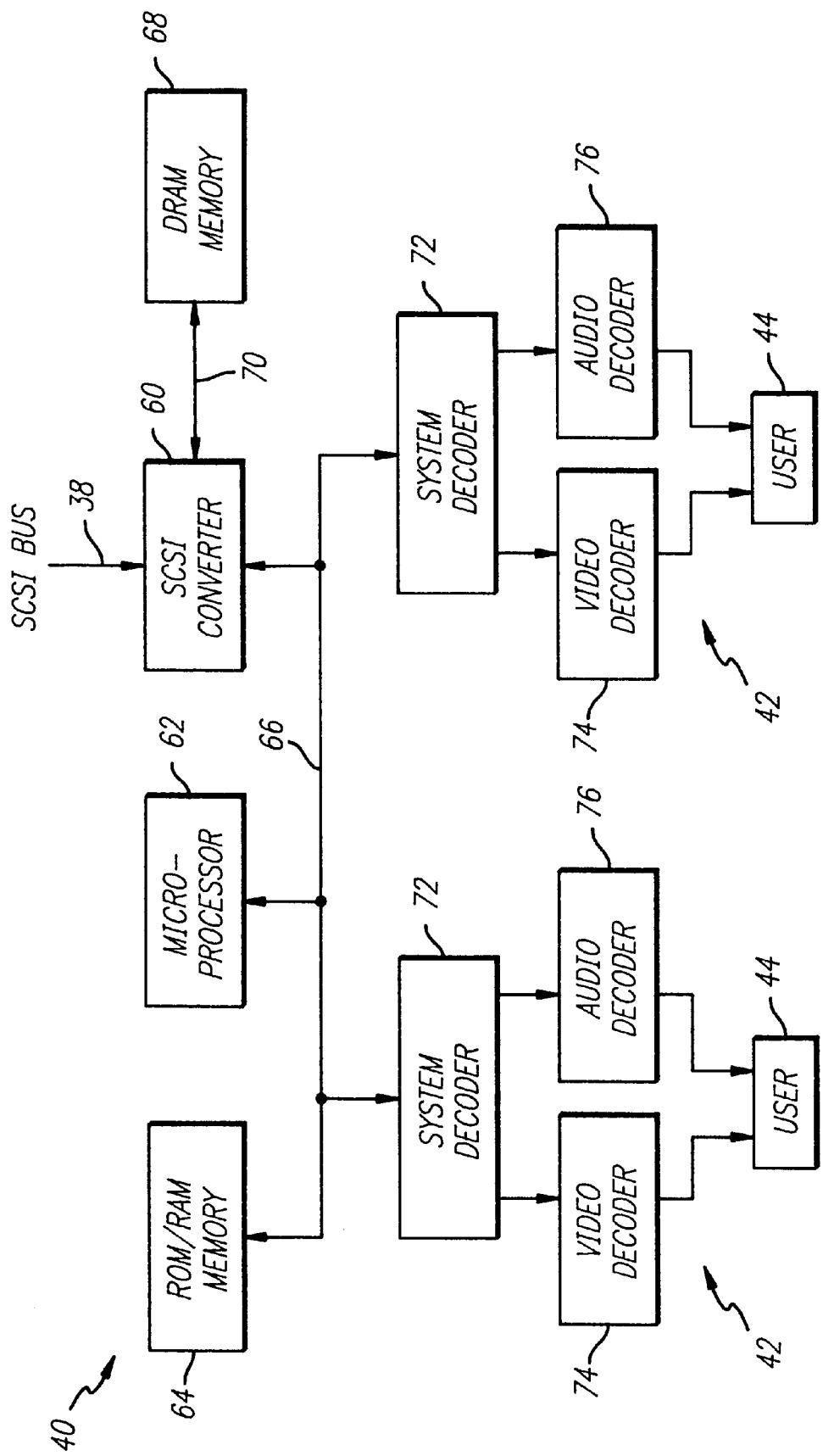

MULTI-USER, ON-DEMAND VIDEO SERVER SYSTEM INCLUDING INDEPENDENT, CONCURRENTLY OPERATING REMOTE DATA RETRIEVAL CONTROLLERS

This application is a continuation of application Ser. No. 08/676,893, filed Jul. 8, 1996, now abandoned, which is itself a continuation of application Ser. No. 08/214,859, filed Mar. 18, 1994, now abandoned.

BACKGROUND OF THE INVENTION

1. Field of the Invention

The present invention generally relates to the art of multi-user, on-demand video entertainment systems, and more specifically to a video server system including independent, concurrently operating remote data retrieval controllers for accessing video files from a central storage.

2. Description of the Related Art

User-on-demand, also known as pay-per-view, video entertainment systems are becoming increasingly popular in motel and hotel facilities as well as in larger scale community cable television (CATV) systems.

Such a system includes a video server located at a central location that stores a plurality of movies that can be selected for viewing by one or more users at any desired time. The video server is connected to television receivers at the individual user locations by a cable or other network.

Each user is provided with means for requesting that a selected movie be retrieved from the server and shown on his television receiver. In a small scale system such as installed in a motel or hotel, an interactive remote control unit can be provided for each television receiver by which the user can request a movie using a menu system displayed on the television screen. In a large scale system such as a community cable television network, the user can call the cable company by telephone to request that the movie fed to his home receiver.

A prior art video server system 10 is illustrated in FIG. 1, and comprises a mass storage unit in the form of a Redundant Array of Inexpensive Drives (RAID) disk drive array 12. Data access to and from the individual drives of the RAID array 12 is controlled by a master controller 14.

A plurality of movies are stored on the array 12 in a distributed or "striped" manner such that any movie can be viewed by more than one user, or even by all users simultaneously starting at different times. The RAID arrangement is further advantageous in that it balances the usage load over the disk drives.

The basic RAID configuration, including a description of distributed storage of data, is disclosed in U.S. Pat. No. 4,870,643, entitled "PARALLEL DRIVE ARRAY STORAGE SYSTEM", issued Sept. 26, 1989 to David Bultman et al, and an improved arrangement is disclosed in my prior U.S. Pat. No. 5,191,584, entitled "MASS STORAGE ARRAY WITH EFFICIENT PARITY CALCULATION", issued Mar. 2, 1993. Both of these patents are assigned to the Micropolis Corporation of Chatsworth, Calif., the assignee of the present invention.

In the illustrated prior art configuration, all of the video and audio movie data and control functions are processed by a PC server 16, which is typically a conventional personal computer (PC). A television receiver at the location of each user 18 is provided with an interactive remote control unit 20 by which the user can request a particular movie from a displayed menu on a pay-per-view basis. Movie requests from the remote control units 20 are sent to the PC server 16.

In response to a movie request, the server 16 sends a command to the RAID array 12 to retrieve the data corresponding to the requested movie from the disk drives. The data is read out of the array 12 and fed back through the server 16 to a decoder array 36 which converts the data into an audio/visual channel and feeds it to the requesting user 18. In order to enable more than one user to view a movie simultaneously, data is retrieved from the array 12 in small time multiplexed blocks.

The prior art system of FIG. 1 is adequate for applications including only a few users. However, a data rate of approximately 375 kilobytes/second per user is required to provide substantially real-time viewing. The data throughput rate scales in proportion to the number of users. A typical personal class computer is capable of a data rate of approximately 6 megabytes. Thus, the system 10 as illustrated in FIG. 1 is only capable of serving approximately 16 users 18.

SUMMARY OF THE INVENTION

It is an object of the present invention to provide a multi-user, on-demand video server system in which the data throughput rate is not limited by a low speed processing device such as a personal computer as it is in a comparable system of the prior art. The present system is therefore capable of very high data rate operation using a Small Computer System Interface (SCSI) bus, enabling three or more times more users to be serviced by the system.

In a video server system according to the present invention, a plurality of movies are distributively stored in digital form on a mass storage unit such as a Redundant Array of Inexpensive Drives (RAID) disk drive system such that they can be viewed on demand by multiple users.

A master controller receives movie requests from users, and generates designation commands through a SCSI data bus that designates a retrieval controller at the requesting user's facility, and locations of the requested movie data in the RAID system. Successive designation commands are generated for successive blocks of the movie data.

A designated retrieval controller reads a designated block of data from the RAID system through the SCSI bus, and converts the retrieved data into video picture and audio format to show the movie on a television receiver at the requesting user's facility.

The movie data is preferably compressed on the RAID system in Motion Picture Experts Group (MPEG) format, and decompressed by the retrieval controllers.

The above and other objects, features and advantages of the present invention will become apparent to those skilled in the art from the following detailed description taken with the accompanying drawings, in which like reference numerals refer to like parts.

DESCRIPTION OF THE DRAWINGS

FIG. 4 is a block diagram illustrating a data retrieval controller of the present system.

DETAILED DESCRIPTION OF THE INVENTION

Figure 2:
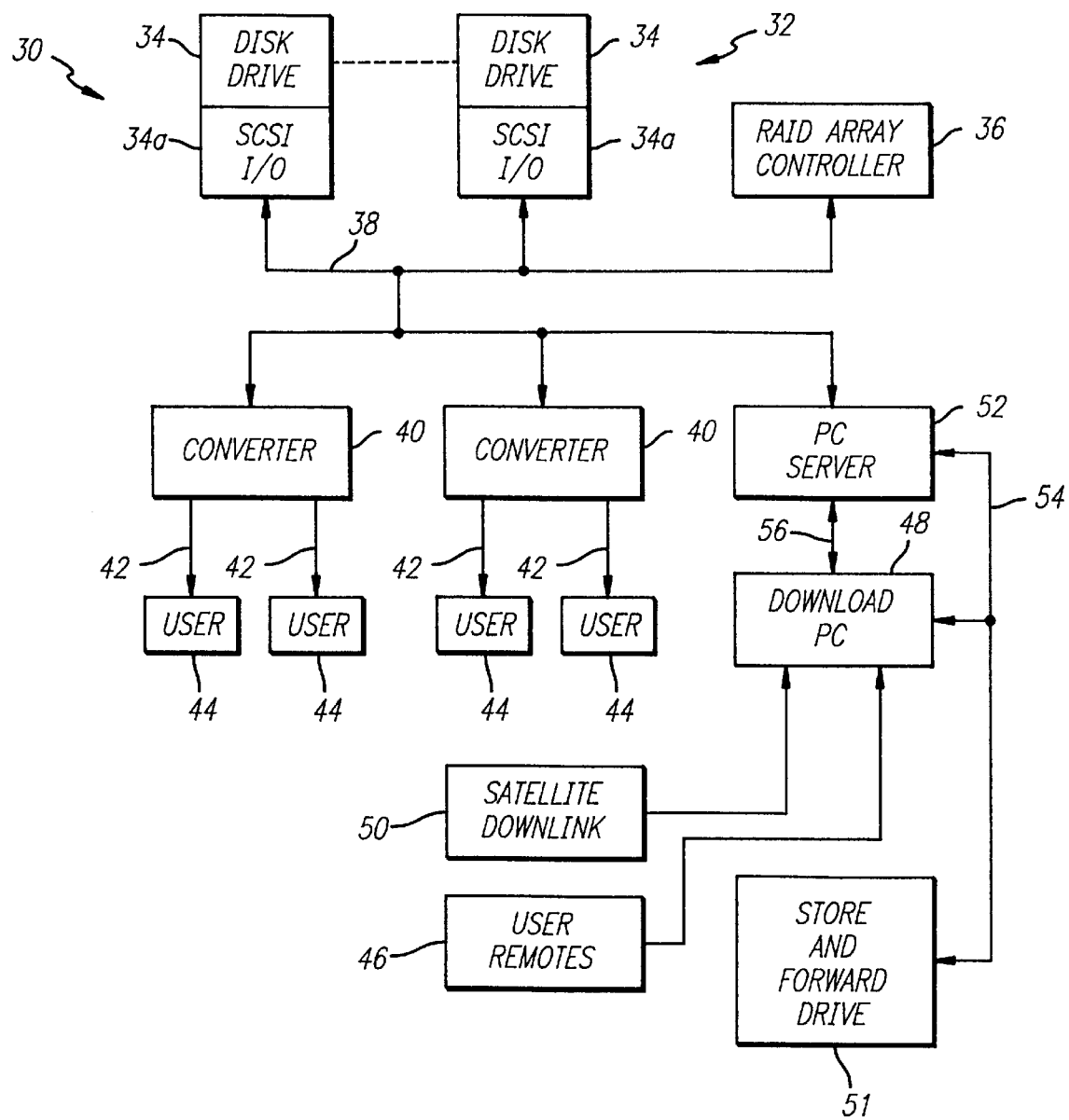
FIG. 2 is a block diagram illustrating a video on-demand, multi-user video server system embodying the present invention.

A multi-user, on-demand video/audio server system 30 according to the present invention is illustrated in FIG. 2. The system 30 comprises a mass storage which is preferably constituted by a Redundant Array of Inexpensive Drives (RAID) array 32, including individual disk drives 34 that are controlled synchronously by a master RAID controller 36. Each disk drive 34 includes a Small Computer System Interface (SCSI) input-output (I/O) interface 34a for connection of the respective disk drive 34 to a wide (16 bit) SCSI data bus 38 that supports a data rate of approximately 18 to 19 megabytes/second.

The system 30 further comprises a plurality of data retrieval controller units or converters 40 that are also connected to the data bus 38. Each converter 40 has at least one output that is connected through a video/audio channel 42 to a television receiver of a user 44. The user receivers can be provided in individual rooms of a motel or hotel facility, or in the homes of individual customers.

A plurality of movies are distributively stored on the RAID array 32 such that any movie can be retrieved and viewed by any user 44 at any time. This is made possible by the manner in which the movie data is stored on the array 32.

More specifically, data elements or bytes of movie video and audio data are stored across the drives 34 of the array 32 in a "striped" arrangement. Each stripe comprises a plurality of successive data bytes that are stored in the same numerical location in the drives 34 respectively. One of the drives 34 is preferably used to store a parity byte for each stripe such that the data for a drive that has malfunctioned or is temporarily removed from service can be reconstructed to provide interrupted operation. The distributed data storage arrangement using a RAID array is described in more detail in the above referenced U.S. patents.

Each user 44 is provided with an interactive remote control unit for requesting a movie from a menu displayed on the user's television receiver. The remote control units are collectively designated as 46, and cause signals or commands designating requested movies to be sent to a download PC 48 which is typically embodied by a personal computer.

The download PC 48, in addition to processing movie requests from the users 44, is used to convert movies received via a downlink 50 from a source provider in analog form into compressed video and audio digital form. The preferred compression format is Motion Picture Experts Group (MPEG), although other compression formats can be used.

The downloaded movie data is temporarily stored on a store and forward drive 51 prior to and during compression. The download PC 48 feeds the compressed video and audio digital to a PC server 52 via a narrow (8 bit) SCSI data bus 54, which in turn stores the data on the drives 34 of the RAID array 32 in the manner described above.

Figure 3A:
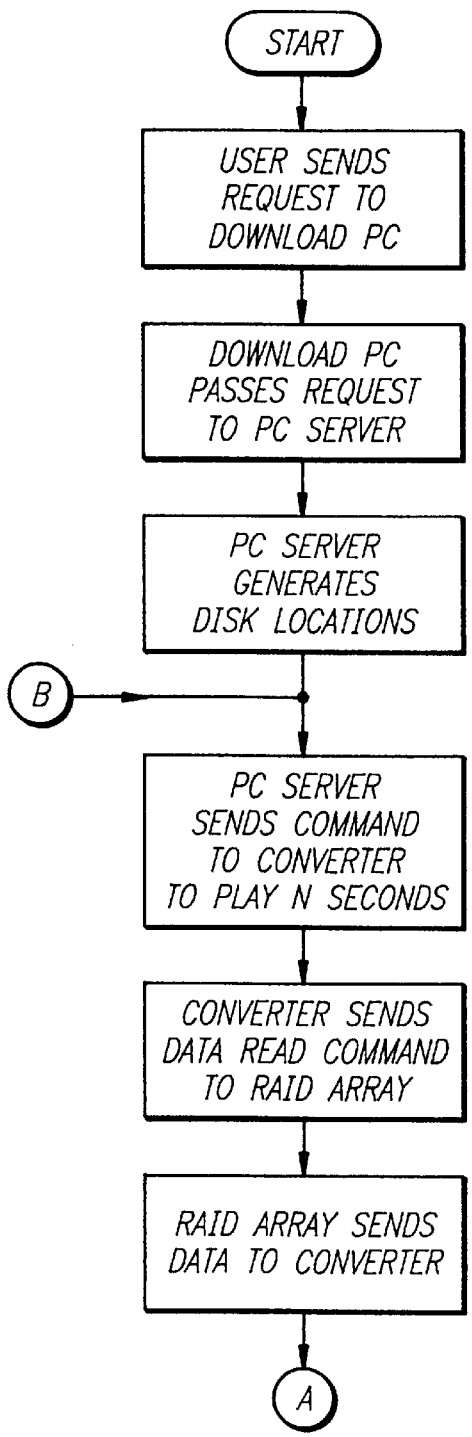
FIGS. 3a and 3b are flowcharts illustrating the operation of the video server system of FIG. 2.
Figure 3B:
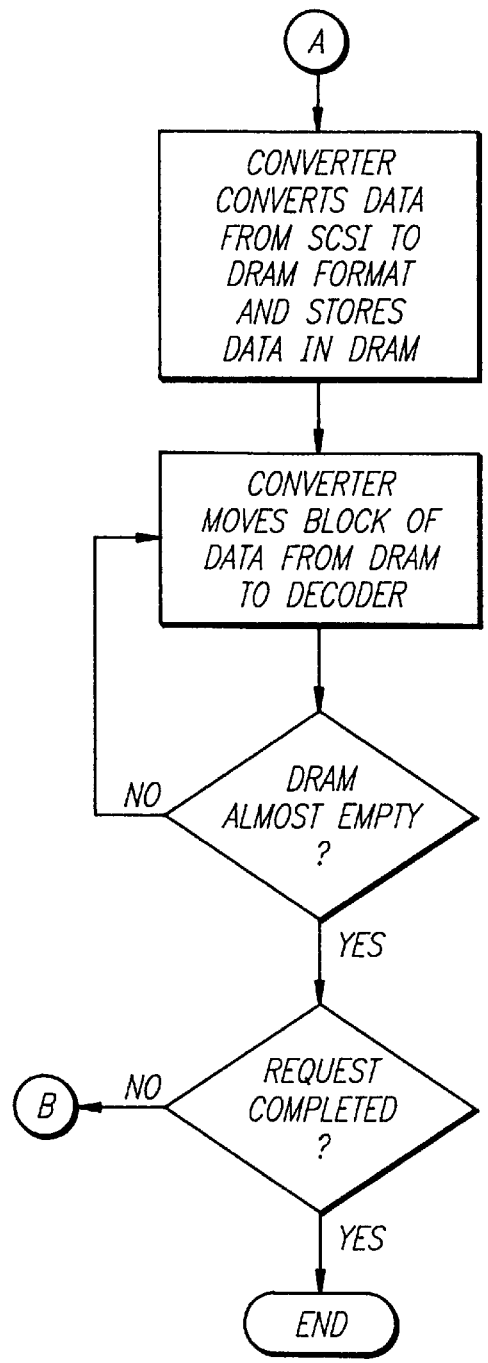

The method of the present invention by which movie data is retrieved from the RAID array 32 and supplied to the requesting users 44 is generally illustrated in the flowchart of FIGS. 3a and 3b. The PC server 52, which can also be a PC class computer, receives requests for movies from the download PC 48 via a low speed data bus 56 such as an RS-232 bus. A movie request as generated by the download PC 48 typically consists of an identification name or number of the user 44 that requested the movie and the name or identification number of the movie.

The PC server 52 stores information designating the specific locations in the array 32 in which each movie is stored. In response to a movie request, the PC server 52 generates a list of all of the locations for the requested movie, and sends a SCSI designation command through the SCSI data bus 38 that designates the converter 40 that is connected to supply the requesting user 44, and a designation of locations in the array 32 from which the designated converter 40 is to retrieve data.

More specifically, the PC server 52 sends successive designation commands to the selected converter 40 designating the locations of successive blocks of data for the requested movie in the array 32. Typically, each designation command will contain the locations of data corresponding to 2 seconds of viewing time for the movie. Assuming a data rate of 375 megabytes/second, a 2 second block of data will correspond to 750 megabytes of data stored in the array 32.

In response to a designation command from the PC server 52, the selected converter 40 responds by sending a SCSI read command through the bus 38 that causes the data at the designated locations in the array 32 to be read out or retrieved and transmitted over the bus 38 to the converter 40.

As will be described in detail below, each converter 40 includes a data buffer that can accommodate asynchronous transmission of data to and from the converter 40 at different rates. The converter 40 decodes or decompresses the MPEG encoded digital data to produce analog picture and sound data and sends it to the requesting user 44 via the channel 42. In this manner, 2 seconds of the requested movie are retrieved from the RAID array 32 and shown on the requesting user's television receiver.

As the decompression and display of the 2 second block of data approaches completion, the converter 40 sends a message to the PC server 52 through the bus 38 indicating that execution of the command has been successfully completed. If the block of data that was just displayed was the last block of the movie, the operation is terminated. If more blocks of the movie remain, the PC server 52 sends a designation command to the converter 40 to retrieve and show the next 2 second block of the movie.

The converters 40 are preferably identical, with one converter 40 being illustrated in FIG. 4. Although the invention is not limited to any specific configuration, the converter 40 preferably comprises a SCSI converter unit 60 that is commercially available as a TEC 356 TRIPLE EMBEDDED CONTROLLER from Emulex Micro Devices of Costa Mesa, Calif. The converter unit 60 is connected to a microprocessor 62 and a ROM/RAM memory 64 via a microprocessor bus 66. The converter unit 60 is also connected to a Dynamic Random Access Memory (DRAM) buffer memory 68 via a memory bus 70. The converter 60 is also connected to the wide SCSI bus 38.

Figure 5:
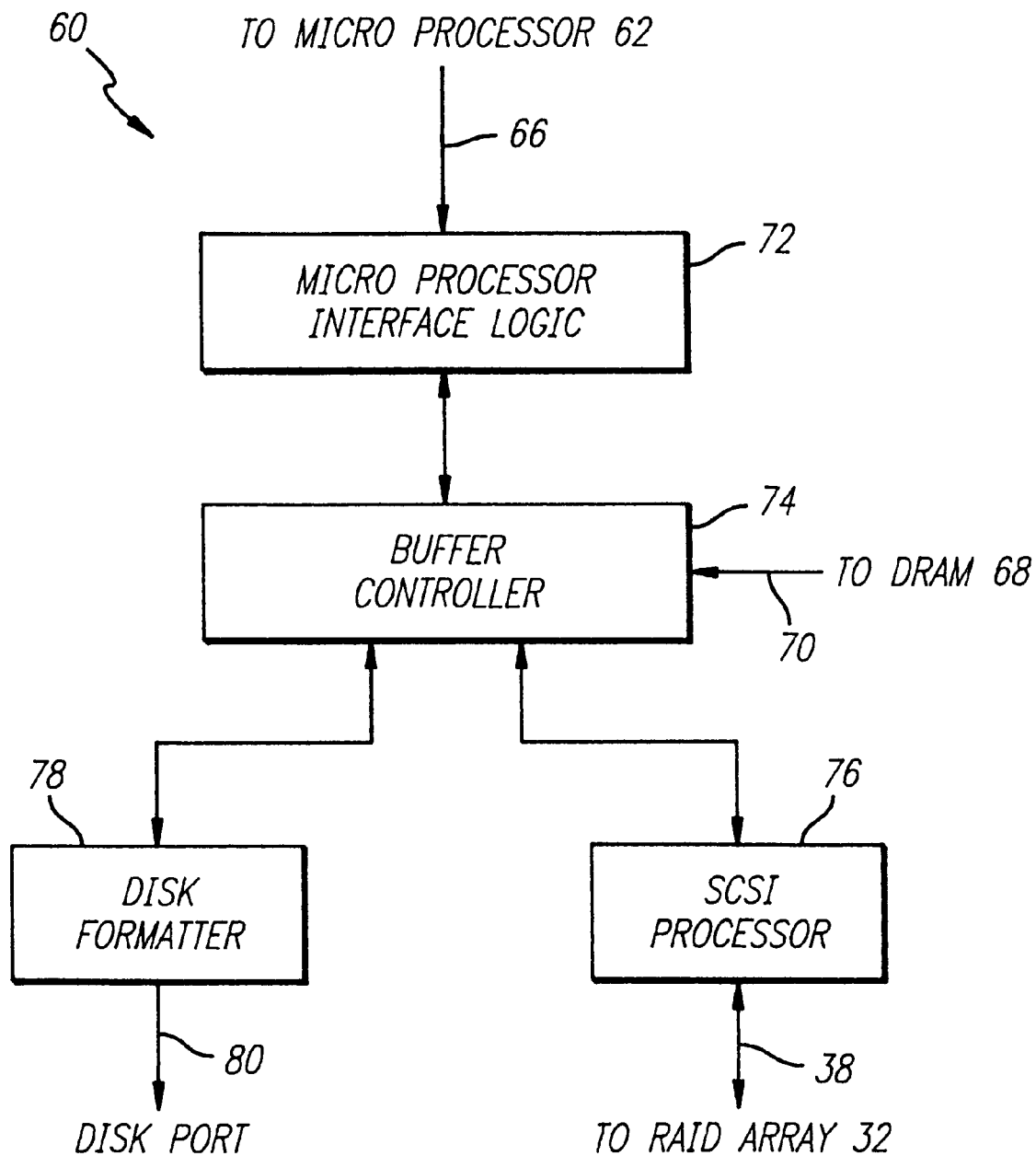
FIG. 5 is a block diagram illustrating a controller module of the controller of FIG. 4.

The SCSI converter 60 is illustrated in more detail in FIG. 5 as comprising a microprocessor logic 72 that is connected to the microprocessor bus 66 and to a buffer controller 74. A SCSI processor 76 is connected between the buffer controller 74 and the wide SCSI bus 38. The buffer controller 74 is connected to the buffer memory 68 through the memory bus 70.

The converter 60 further comprises a disk formatter 78 having a disk port 80 which is not used in the preferred embodiment of the invention since the drives 34 of the RAID array 32 are provided with the SCSI I/O units 34a. However, the scope of the invention is not so limited. If disk drives that are not provided with a SCSI capability are used, for example, they can be connected to the converter 60 via the disk port 78.

The microprocessor 62 is typically an Intel 80186, although the invention is not so limited. The microprocessor 62 controls the data retrieval and forwarding operations as directed by an operating program stored in the memory 64. In response to a designation command applied to the converter 60 through the bus 38, the microprocessor 62 sends a SCSI read command to the RAID array 32 instructing that the selected data for the 2 second movie block be retrieved and sent back through the bus 38 in SCSI format.

The microprocessor 62 controls the controller 60 to cause the digital movie data that is addressed thereto by the array 32 to be converted from SCSI format into a format suitable for storage in the memory 68. The memory bus 70 comprises two Direct Memory Access (DMA) channels that enable data to be simultaneously written into and read out of the memory 68.

The 2 second block of data is read out of the buffer memory 68 under control of the microprocessor 62 and fed to a system decoder 72 for the requesting user 44 through the microprocessor bus 66. A single converter 40 can support more than one, here illustrated as two, video/audio channels 42 for respective users 44, with a separate decoder 72 provided for each user 44.

The system decoder 72 separates the video digital data from the audio digital data and feeds them to a video decoder 74 and an audio decoder 76 respectively along with requisite timing signals. Each channel 42 is constituted by analog audio and video outputs of the decoders 74 and 76 respectively.

The video decoder 74 is preferably embodied by a CL950 MPEC VIDEO DECODER that is available from C-Cube Microsystems of Milpitas, Calif. The decoder 74 decompresses the digital video data to produce analog video picture data in, preferably, RS-170A Analog Composite Video format. The decoder 76 decompresses the digital audio data to produce an analog audio signal in, preferably, the 48 KHz Analog Video standard. These signals are transmitted through the channel 42 and applied to show the 2 second block of the movie on the requesting user's television receiver.

The two DMA channels of the memory bus 70 enable the converter 60 to compensate for variable data rates that are inherent in data retrieval from the RAID array 32 and decompression of MPEG encoded data. Since a number of users 44 can be watching movies at the same time and the designation commands compete for transmission over the bus 38 under the SCSI protocol, data will be received by the converter 40 from the RAID array 32 and stored in the buffer memory 68 at a variable rate. This rate will be much higher than the rate at which data is read out of the buffer memory 68 and decompressed by the decoders 74 and 76.

The decoders 74 and 76 feed the analog output signals into the channel 42 at a fixed rate corresponding to a video frame rate of 30 frames/second. MPEG decompression is performed at a variable rate depending on the correlation between adjacent video frames. For this reason, data will be read out of the buffer memory 68 and applied to the decoder 72 at a variable rate. The buffer memory 68 is required to enable the data to be retrieved from the RAID array 32 and output to the decoder 72 at different rates.

When the buffer memory 68 is almost empty (less than a predetermined number of bytes remain in the memory 68), the microprocessor 62 sends a SCSI message to the PC server 52 indicating that the operation of decompressing and showing the selected 2 seconds of movie data has been completed. In response to this message, the PC server 52 sends a designation command to the converter 40 to cause data corresponding to the next 2 second block of the movie to be retrieved from the RAID array 32 and shown on the user's television receiver.

Figure 1:
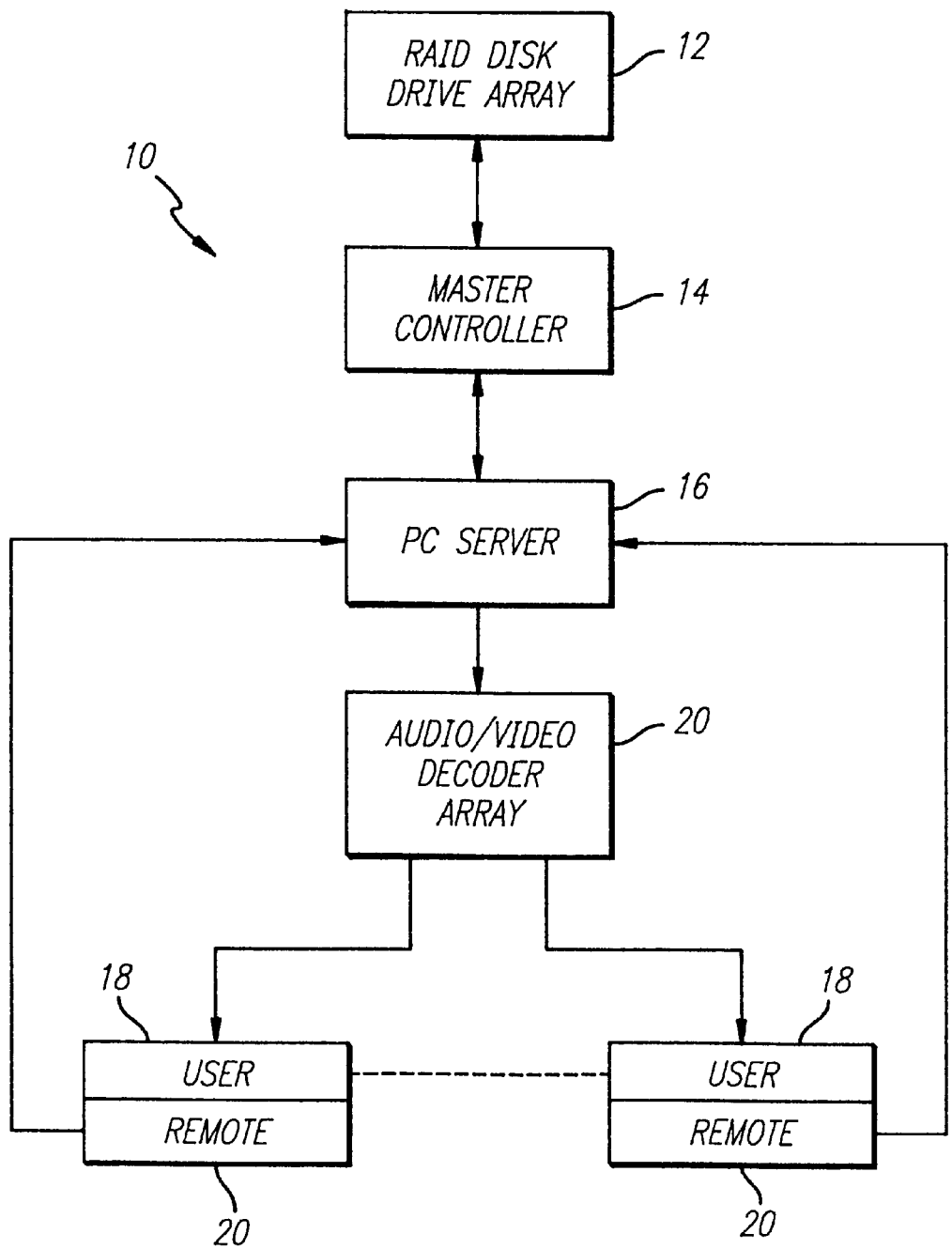
FIG. 1 is a block diagram illustrating a prior art on-demand, multi-user video server system.

The present invention enables a number of converters to supply video and audio movie signals to respective users 44 simultaneously, with the data transfers over the SCSI bus 38 being arbitrated by the SCSI protocol. In an exemplary application, 14 converters 40 can be connected to the RAID array 32, with 4 users being served by each converter 40 via a respective channel 42. Thus, a total of 56 users can be served by the system 30, as opposed to 16 users for the prior art system of FIG. 1.

Various modifications will become possible for those skilled in the art after receiving the teachings of the present disclosure without departing from the scope thereof.

For example, the SCSI bus architecture can be replaced with another type of interconnect protocol, for example Peripheral Component Interconnect (PCI) or optical fibers.

Another modification that is within the scope of the invention is to provide two RAID arrays, each of which has its own SCSI interface, and distribute the movie data across the two arrays. 56 users can be served by each SCSI interface for a total of 112, thereby doubling the number of users over the basic configuration described above. It is also possible to combine three or more RAID arrays in an essentially similar manner.

I claim:

1. A data storage and retrieval system, comprising:
   a storage for storing data;
   a data bus connected to the storage;
   a plurality of data retrieval controllers connected to the data bus, each of the plurality of data retrieval controllers being configured for actively retrieving data from the storage and converting the retrieved data to a predetermined format;
   a download computer converting data received in analog form into compressed digital format to be stored in the storage, as well as receiving from interactive remote control units and processing data request commands; and
   a server interfacing between the download computer and the storage as well as between the download computer and the plurality of data retrieval controllers, the server generating in response to the processed data request commands designation commands to be sent to the data retrieval controllers through the data bus, each designation command designating one of the data retrieval controllers and a storage location corresponding to requested data;
   each designated data retrieval controller retrieving the requested data from the designated storage location in response to a respective designation command and sending a message to the server indicating that execution of the designation command has been completed.

2. A system as in claim 1, in which:
   the data is stored in the storage in the form of a digital data file; and
   the designation commands sent by the server are successive and designating the storage locations of successive blocks of said digital data file respectively.

3. A system as in claim 2, in which said digital data file comprises video movie data.

4. A system as in claim 2, in which the storage comprises a plurality of disk drives for distributively storing said blocks of said digital data file.

5. A system as in claim 1, in which:

the server sends the designation commands through the data bus to the data retrieval controllers using a small Computer System Interface (SCSI) protocol; and the retrieval controllers retrieve data from the storage through the data bus using SCSI protocol.

6. A system as in claim 5, in which:

the retrieval controllers retrieve data from the storage by sending SCSI read commands through the data bus to the storage; and the storage transmits data through the data bus to the retrieval controllers in SCSI format in response to the SCSI read commands.

7. A system as in claim 5, in which:

the storage stores said data in the form of digital video data;

the retrieval controllers convert retrieved digital video data from SCSI format into video picture format.

8. A system as in claim 1, in which:

the storage stores said data in the form of compressed digital data; and each retrieval controller comprises a decoder for decompressing said compressed digital data.

9. A system as in claim 1, in which:

the storage stores said data in the form of digital video data that is compressed in Motion Picture Experts Group (MPEG) format; and each retrieval controller comprises an MPEG decoder for decompressing said digital video data.

10. A system as in claim 1, wherein the system is configured as a multi-user, on-demand video server system which uses a small computer system interface (SCSI) bus and is capable of providing high rate data throughput.

11. A system as in claim 1, in which each of the data retrieval controllers includes a single buffer memory and is configured to receive and store said data in said buffer memory at a variable rate which is greater than a rate at which said data is read out of said buffer memory by decoders.

12. A system as in claim 1, in which each of the data retrieval controllers accommodates asynchronous data transmission to and from it at different rates and compensates for variable data retrieval and conversion rates.

13. A method for actively retrieving data from storage, comprising:

storing data in a storage;

providing a plurality of data retrieval controllers connected to the storage, each of the data retrieval controllers being capable of actively retrieving data from the storage and converting the retrieved data to a predetermined format;

converting data, in a download computer, from analog form into compressed digital format to be stored in the storage;

receiving and processing, in the download computer, data request commands;

sending, in response to the data request commands, designation commands from a server to the data retrieval controllers, each designation command designating one of the data retrieval controllers and a storage location corresponding to requested data to be retrieved from the storage by the designated data retrieval controller;

retrieving by the respective designated data retrieval controllers requested data corresponding to the designated storage locations using read commands;

producing each retrieved data in a predetermined format at an output of the respective designated data retrieval controller; and sending to the server by the respective designated data retrieval controllers a message indicating that execution of each corresponding designation command has been completed.

14. A method as in claim 13, in which:

the data is stored in the storage in the form of a digital data file; and the designation commands are successive and designating successive blocks of said digital data file respectively.

15. A method as in claim 14, in which said digital data file comprises video movie data.

16. A method as in claim 14, in which the storing of the data further comprises distributively storing the blocks of the digital data file on a plurality of disk drives.

17. A method as in claim 13, in which the sending of the designation commands further comprises sending the designation commands from the server to the data retrieval controllers through a data bus using Small Computer System Interface (SCSI) protocol, and causing the data retrieval controllers to retrieve data from the storage through the data bus using SCSI protocol.

18. A method as in claim 13, in which the retrieving by the respective designated data retrieval controllers further comprises:

causing the data retrieval controllers to send SCSI read commands through the data bus to the storage; and causing the storage to transmit the requested data through the data bus to the retrieval controllers in SCSI format in response to the SCSI read commands.

19. A method as in claim 13, in which:

the storing of data in the storage comprises storing said data in the form of digital video data; and the producing of each retrieved data further comprises converting retrieved digital video data from SCSI format into video picture format.

20. A method as in claim 13, in which:

the storing of data in the storage comprises storing said data in the form of compressed digital data; and the producing of each retrieved data further comprises decompressing said compressed digital data.

21. A method as in claim 13, in which:

step (a) comprises storing said data in the form of digital video data that is compressed in Motion Picture Experts Group (MPEG) format; and step (g) further comprises decompressing said compressed digital data.

22. A video server system, comprising:

a mass storage unit in which a plurality of movies are distributively stored in digital form such that the movies can be viewed on-demand by multiple users;

a download computer capable of converting movie data received in analog form into compresses digital format to be stored in the mass storage unit as well as receiving from interactive remote control units and processing movie requests;

a server configured to receive processed movie requests from the download computer and, in response to each movie request, generate designation commands;

a plurality of retrieval controllers connected to the server via a SCSI bus to receive therefrom the designation commands, each of the designating commands designating one of the retrieval controllers and a storage location corresponding to requested movie data, each of the designated retrieval controllers retrieving the requested movie data from the mass storage unit via the SCSI bus by sending read commands to the mass storage, each of the designated the retrieval controllers also sending messages to the server indicating that execution of the respective designation commands has been completed.

23. A system as in claim 22 further comprising:

a menu capable of being displayed on each of the user receivers and listing a selection from the plurality of movies; and one or more of the interactive remote control units that are remotely linked to the download computer for sending thereto commands requesting selected movies from among the listed movies.

24. A system as in claim 22 in which:

the mass storage unit has a master controller that controls its operations; and the server interfaces between the download computer and the mass storage unit for delivering to the mass storage unit movie data received from the download computer in compresses digital format to be stored and accessed under control of the master controller.

25. A system as in claim 22 further comprising:

a downlink, the download computer being coupled to the downlink and converting the movie data received from the downlink into the compressed digital format.

26. A system as in claim 22 further comprising:

video/audio channels interfacing between the retrieval controllers and corresponding user receivers and delivering requested movies data from respective designated retrieval controllers to the corresponding user receivers, the data being produced by the respective designated retrieval controllers in a predetermined format.

27. A system as in claim 22, wherein the server is linked to the download computer trough a low speed data bus for receiving therefrom the movie requests and a narrow SCSI bus for receiving therefrom the movie data in the compressed digital format.

28. A system as in claim 22, wherein the server maintains information indicating the data locations in the mass storage unit for each of the plurality of movies, and in response to a movie request from the download computer the server produces a list of all storage locations for the requested movie.

29. A system as in claim 22, wherein each retrieval controller includes:

a processor configured to send read commands to the mass storage via the SCSI bus under a SCSI protocol, the read commands designating movie data to be read from the mass storage in accordance with the respective designation command;

a processor bus;

a memory; and a SCSI converter unit interfacing with the processor and memory through the processor bus.

30. A system as in claim 29, wherein the SCSI converter unit includes:

a buffer controller;

one or more disk formatters;

an interface logic connected to the processor bus and interfacing between the buffer controller and the one or more disk formatters.

31. A system as in claim 22, in which the server is linked to the download computer via a SCSI interface and a data bus for receiving therefrom the converted movie data and the processed movie requests, respectively.

32. A system as in claim 22, in which the server, the mass storage, and the plurality of retrieval controllers are linked via a SCSI interface.

33. A system as in claim 22, in which the retrieval controllers are each capable of supporting more than one video/audio channel with a separate decoder for each video/audio channel to a corresponding user receiver.

34. A system as in claim 22, in which each of the retrieval controllers accommodates asynchronous data transmission to and from it at different rates and compensates for variable data retrieval and conversion rates.

35. A method for providing video on-demand, comprising:

distributively storing data of a plurality of movies in a mass storage having drives, the data stored across the drives in a stripped arrangement so that each strip includes a plurality of successive bytes that are stored in a same location in the drives, respectively;

storing in one of the drives a parity byte corresponding to each of the strips for malfunction detection and recovery;

synchronously controlling the drives by a master controller;

converting in a download computer movie data received in an analog form into compressed digital format to be stored in the mass storage, the converted movie data being delivered to the mass storage via a server that is linked to the down load computer by a SCSI interface;

receiving and processing at the download computer requests for selected movies from among the plurality of movies, and sending the processed requests to a server;

producing at the server a list of data locations in the drives for each selected movie and sending a succession of SCSI designation commands to retrieval controllers designating the respective retrieval controllers and data locations for each selected movie;

sending read commands from each designated retrieval controller; and converting data retrieved from the drives into formats suitable for respective user receivers.

36. A method as in claim 35 further comprising:

providing a buffer in each of the retrieval controllers to accommodate asynchronous transmission of data to and from the retrieval controllers at different rates and compensate for variable data retrieval and decompression rates.

37. A method as in claim 35, wherein the data is stored in the mass storage in a compressed format, the method further comprising:

decompressing at the respective retrieval controllers the data retrieved from the drives; and sending the converted data from the retrieval controllers to respective user receivers via respective video/audio channels.

38. A method as in claim 37, wherein the compressed format is a Motion Picture Experts Group (MPEG) format.

39. A method as in claim 35, wherein each of the SCSI designation commands facilitates a reading of a data block from the respective drives, the data block providing a portion of a respective selected movie whose duration approximates a portion of a respective movie time.

40. A method as in claim 39, wherein the duration approximating the portion of the respective movie time is about 2 seconds.

* * * * *